Sept. 15, 1942.     R. B. COTTRELL     2,295,548
SPRING CONTROL UNIT
Filed Dec. 18, 1940     3 Sheets-Sheet 1
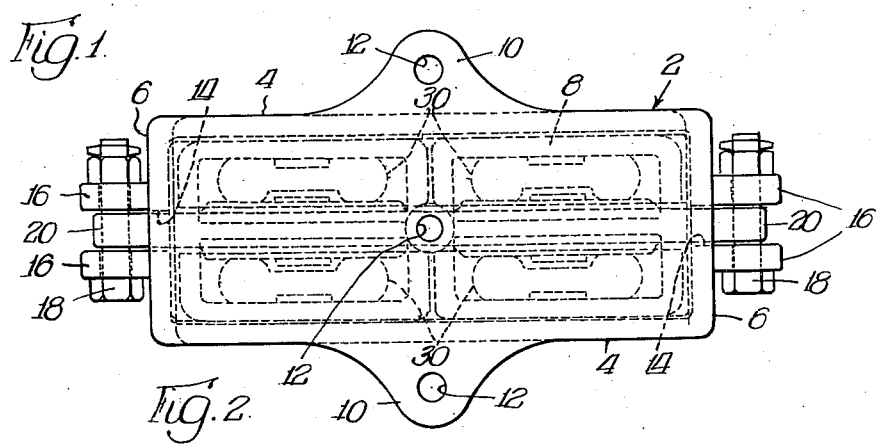
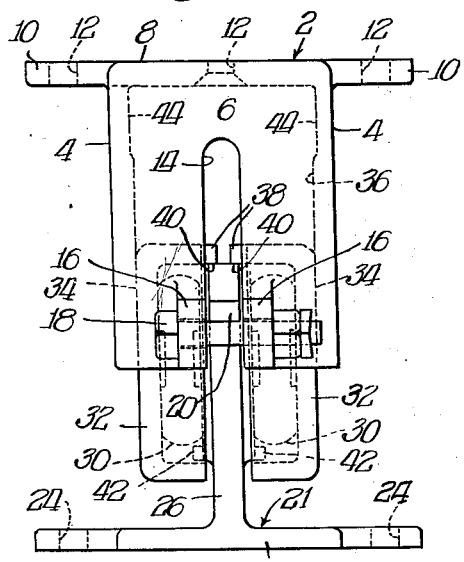
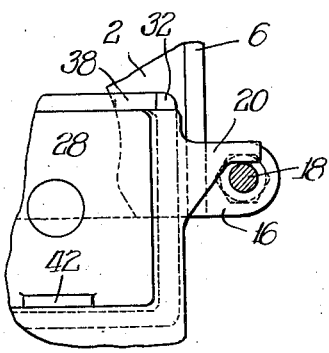
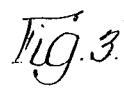
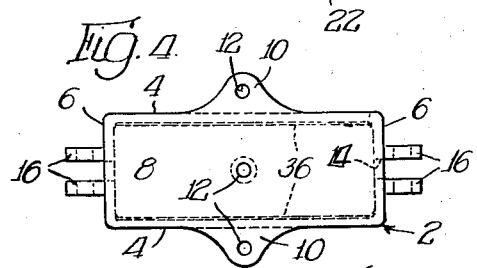
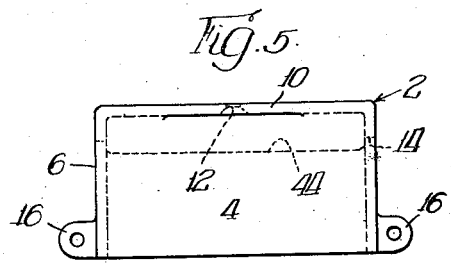
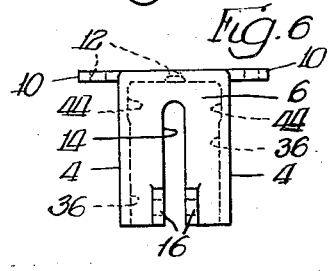
INVENTOR.
Robert B. Cottrell,
BY
ATTY.

Sept. 15, 1942.　　R. B. COTTRELL　　2,295,548
SPRING CONTROL UNIT
Filed Dec. 18, 1940　　3 Sheets-Sheet 2
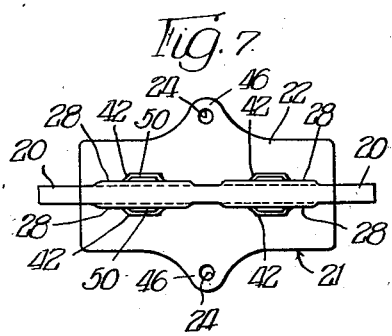
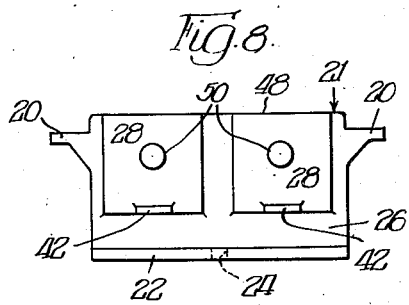
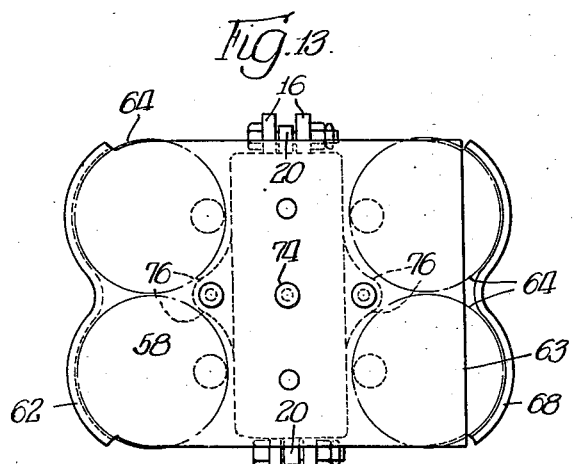
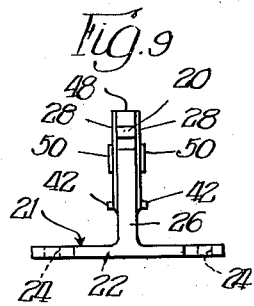
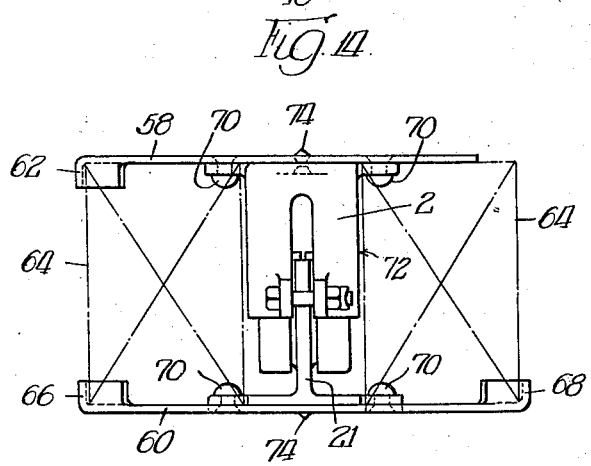
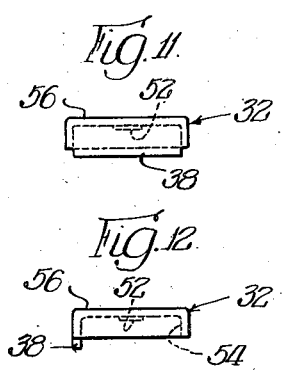
INVENTOR.
Robert B. Cottrell,
BY
attij.

Sept. 15, 1942.     R. B. COTTRELL     2,295,548
SPRING CONTROL UNIT
Filed Dec. 18, 1940     3 Sheets-Sheet 3
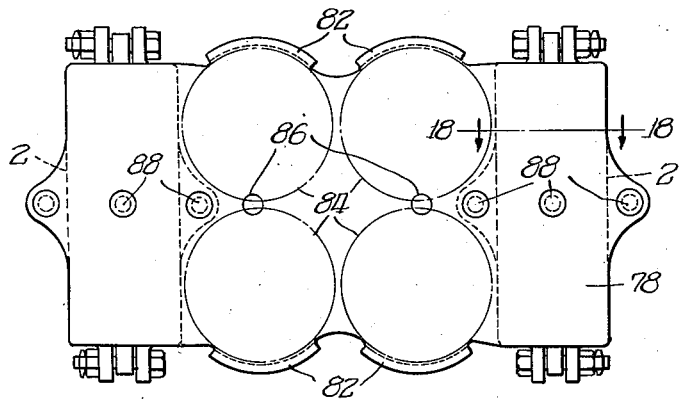
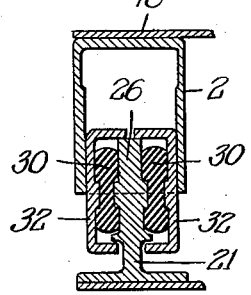
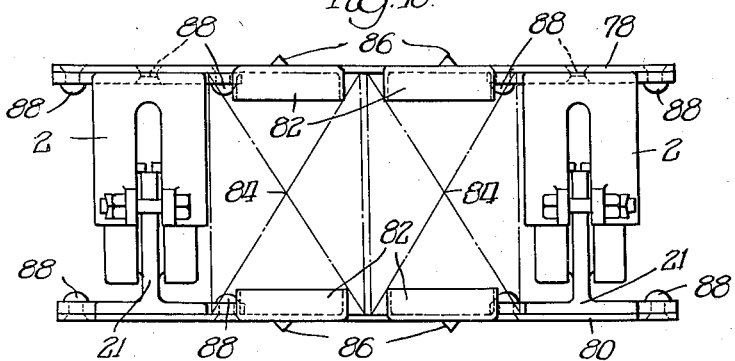
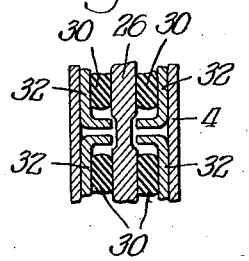
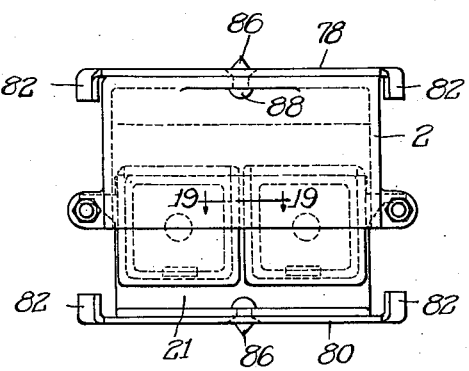
INVENTOR.
Robert B. Cottrell
BY
atty.

Patented Sept. 15, 1942

2,295,548

UNITED STATES PATENT OFFICE 2,295,548

SPRING CONTROL UNIT

Robert B. Cottrell, Chicago, Ill., assignor to American Steel Foundries, Chicago, Ill., a corporation of New Jersey Application December 18, 1940, Serial No. 370,628

23 Claims. (Cl. 267—9)

My invention relates to a control unit for association with spring groups and particularly adapted for use on railway equipment but suitable for any application where it is desired to restrain the normal oscillatory action of coil springs or similar device.

In recent years considerable effort and study has been directed to the solution of problems rising from the uncontrolled actions of coil springs when used on vehicles, particularly railway equipment. At the present time it is well recognized that some sort of snubbing means is desirably used in association with coil springs and sometimes with elliptic springs as well, although when properly designed, an elliptic spring has qualities of friction absorption which may prevent the development of synchronous vibrations.

To those skilled in the art it will be apparent that the amount of frictional absorption desired may vary with different conditions of load; for example, under ordinary operating conditions the load carried by the springs of a freight car may vary 300 to 400% from light car to full load. In the modification of my novel friction absorbing device shown herein, the amount of frictional absorption will increase as the load increases and as the coil springs supporting the load are increasingly deflected or compressed.

A more specific object of my invention is to design a snubbing arrangement comprising a top follower or housing having flat vertical friction walls and a bottom follower in the form of a shoe carrier or support means upon which box-like shoes may be mounted for frictional engagement with the inner surfaces of said housing.

My invention comprehends a novel form of bottom follower or friction shoe support comprising a vertical wall upon which may be mounted friction shoes, and seats for resilient pads normally supported between said friction shoes and said shoe support.

My invention also contemplates such an arrangement as that described wherein the engaging friction surfaces are automatically increased as the supported load is increased, as for example, greater friction will be developed under a loaded car with my device than under an empty car.

My invention comprehends the use of my novel friction absorbing arrangement in combination with various groups of coil springs such as shown and described herein. In one of said combinations my novel friction absorbing arrangement is centrally disposed with respect to the coil springs with which it is associated and in another it may be shown associated with such a group adjacent the outer perimeter of the group in order to afford a relatively long lever arm for the forces developed thereby.

Figure 1 is a top plan view of my novel form of control unit.

Figure 2 is an end elevation thereof, and Figure 3 is a fragmentary side elevation.

Figures 4, 5 and 6 show my novel form of housing follower, Figure 4 being a top plan view thereof, Figure 5 a side elevation, and Figure 6 an end elevation.

Figures 7, 8 and 9 show my novel form of bottom follower anad friction shoe support, Figure 7 being a top plan view thereof, Figure 8 a side elevation, and Figure 9 an end view.

Figures 10, 11 and 12 show the detail of my novel friction shoe, Figure 10 being a plan view thereof, Figure 11 an end elevation and Figure 12 a side elevation.

Figures 13 and 14 show my novel control unit in conjunction with a coil spring group, Figure 13 being a top plan view of such an arrangement, and Figure 14 a view in elevation.

Figures 15, 16 and 17 show a plurality of my novel control units in combination with a coil spring group, Figure 15 being a top plan view thereof, Figure 16 a side elevation, and Figure 17 an end view.

Figure 18 is a fragmentary sectional view taken in the vertical plane indicated by the line 18—18 of Figure 15, and Figure 19 is a further sectional view taken in the horizontal plane indicated by the line 19—19 of Figure 17.

Describing my novel control unit in detail and referring more particularly to the assembly view shown in Figures 1 to 3 inclusive, the control unit comprises a top follower in the form of a housing 2 of generally rectangular form having side walls 4, 4 and end walls 6, 6 integrally formed with a top wall 8. The top wall 8 may be projected centrally of the device to form the lateral retaining lugs 10, 10, and said lugs and top wall may be perforated as at 12, 12 for reception of rivets or similar securing means by which the top follower or housing may be fixed to a top spring plate or other spring abutment means. Each end wall 6 may be formed with a vertical slot 14 and adjacent the lower edge of said wall at opposite sides of said slot may be formed spaced lugs 16, 16 with aligned openings for reception of a bolt or cotter 18, said bolt 18 serving as a stop for abutment of a lug 20 integrally formed adjacent the top edge of the friction shoe support at each end thereof. Said bolt or limit stop 18 may be used in assembly of the unit and until said device has been placed under load after which it may be removed or discarded, the purpose of said bolt being to retain the parts in assembly when the device is used in conjunction with a spring group in which the coil springs may be under some precompression.

The bottom follower or friction shoe support 21 comprises a base plate 22 perforated as at 24, 24 for reception of securing means, by which it may be fastened to a spring plate or other spring abutment means. Centrally of the base 24 is formed the upright wall or shoe support 26 on opposite faces of which may be formed the raised pads or seats 28, 28 (Figure 7), each of which affords abutment means for an adjacent rubber pad or spring 30 normally under compression between said pad 28 and the spaced friction shoe 32 (Figures 10, 11 and 12), said shoe being a boxlike structure of rectangular form, the back wall of which may have frictional engagement as at 34 against the adjacent friction surface 36 formed on the side wall 4 of the top follower or housing.

The top wall of each friction shoe 32 is extended in a horizontal flange 38 against which the flat top edge of the vertical wall 26 may abut as at 40, 40, and laterally extending lugs 42, 42 may be formed on the wall 26 adjacent the lower edges of the pads 28, said flanges 38 and lugs 42 serving to prevent vertical play between the bottom follower 22 and the shoes 32 which are supported thereby. The inner surfaces of the lateral walls 4 of the top follower may be relieved as at 44, 44 to prevent formation of shoulders thereon due to wear on the friction surfaces 36, 36.

The housing or top follower 2 is shown in detail in Figures 4, 5 and 6. It may be noted that the friction surfaces 36, 36 extend entirely along the length of the lateral walls 4, 4 for engagement with the friction shoes but are relieved as at 44 along their upper edges for the purpose already described.

The friction shoe support or bottom follower 21 is shown in detail in Figures 7, 8 and 9. The bottom wall 22 is of generally rectangular form having the lateral lug-like projections 46, 46 in which may be formed the before-mentioned openings 24, 24 for reception of securing means. The vertical wall 26 rising centrally from the base plate 22 is formed with a smooth top edge 48 for engagement with the shoe flanges 38 as already described, and at opposite ends of the vertical wall adjacent the top edges are formed the limiting lugs or stops 20. On opposite sides of the wall 26 are formed the spaced pads or seats 28, 28 for abutment of the rubber pad or spring, and centrally of each seat 28 is formed a spring positioning lug 50. At the bottom edge of each pad 28 is also formed the horizontal lug 42 for abutment against the bottom wall of the adjacent shoe.

The detailed form of each friction shoe 32 is shown in Figures 10, 11 and 12. The rectangular box-like form already described forms a convenient housing for the rubber pad or spring which may be positioned therein by means of the centrally formed lug 52 and the bottom wall may form an abutment as at 54 for the lugs 42 on the vertical wall of the bottom follower as already described. It is clearly apparent that the flange 38 formed as a projection of the top wall serves as an abutment for the top edge of the wall 26 on the bottom follower. The back wall of the shoe may be formed with a smooth surface as at 56 for frictional engagement with the inner friction surfaces on the top follower or housing.

Figures 13 and 14 show in reduced size the application of my novel control unit to a spring group. Said spring group comprises the top spring plate 58 and the bottom spring plate 60, said top spring plate being flanged over at its outer edge in an arcuate or scallop-like arrangement as at 62 to serve as positioning means for spaced coil springs 64, 64 (diagrammatically indicated). In the spring group shown, the inboard edge 63 of the plate 58 is plain and unflanged, and by this means interference is avoided with a commonly used form of load carrying member or bolster normally supported thereon. The bottom spring plate 60 is similarly flanged over at its outboard end as at 66 and at its inboard end as at 68 thus affording positioning means for the coil springs at each end of the group. Secured to the top and bottom spring plates as at 70, 70 may be my novel control unit generally designated 72 of a form heretofore described in detail, including the top follower 2 and the bottom follower 21 secured respectively to the top and bottom spring plates. The spring plates may be formed with central lugs 74, 74 serving as positioning means for said plates against the supporting and supported truck members. The contour of the securing lugs on the top and bottom follower 2 and on the bottom follower 21 may be such as conveniently to form additional positioning means for the coil springs as at 76, 76.

It will be understood that in assembling my novel device the shoes may be clamped together with the rubber springs therebetween under compression against the vertical plate of the supporting follower, after which the housing may be placed in position thereover.

As the clamp is released from the shoes they will be forced against the opposite friction surfaces of the housing, thus developing the desired friction. As already stated the engaging area on the housing and shoes may be varied to meet different conditions and likewise the character of the rubber springs or pads may similarly be altered for the same purpose.

In Figures 15 to 17 inclusive I have shown my novel control unit in conjunction with a group of coil springs and in this modification the control unit is shown as applied adjacent the outer edges of the spring group in such manner as to afford a maximum lever arm for the forces developed thereby. As shown the group comprises top and bottom spring plates 78 and 80 flanged over along spaced arcuate portions of their opposite edges as at 82, 82, said flanges affording retaining means for coil springs diagrammatically indicated at 84, 84. The top and bottom spring plates 78 and 80 may be afforded lugs 86, 86 serving as positioning means for the spring group assembly when in abutment with supporting and supported truck members. At each end of the group may be mounted one of my novel control units comprising the upper follower or housing 2 and the bottom follower or friction shoe support 21, said parts and other features of said control unit conforming in detail to that structure as already described. As shown the base portion of each top follower 2 may be riveted as at 88, 88 to the top spring plate, and similarly the base plate of the bottom follower or friction shoe carrier 21 may be riveted at spaced points as at 88, 88 to the bottom spring plate.

In the sectional views of Figures 18 and 19 there are shown in detail the various parts of the control unit associated with this spring group in accordance with the features already described.

In the modification shown in Figures 15, 16 and 17 the forces developed by the control units are afforded release along lever arms positioned at the extremities of the units in order that the said forces may operate more effectively as squaring means between the supporting and supported truck members.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a spring group, top and bottom spring plates, coil springs interposed therebetween, and an associated friction absorbing device comprising a top follower secured to one of said plates and a bottom follower secured to the other thereof, one of said followers comprising spaced parallel vertical friction walls and the other of said followers having a vertical wall interposed between said friction walls and forming a shoe carrier, friction shoes mounted on opposite sides of said carrier in engagement with said friction walls respectively, a rubber pad under compression between said carrier and each of said shoes, and engaging means on said carrier and said shoes to limit relative vertical movement therebetween.

2. In a spring group, top and bottom spring plates, coil springs interposed therebetween, and an associated friction absorbing device comprising a top follower secured to one of said plates and a bottom follower secured to the other thereof, one of said followers comprising spaced parallel vertical friction walls and the other of said followers comprising a vertical wall interposed between said friction walls and forming a shoe carrier, friction shoes mounted on opposite sides of said carrier in engagement with said friction walls respectively, and a rubber pad under compression between said carrier and each of said shoes.

3. In a spring group, top and bottom spring plates, coil springs interposed therebetween and an associated friction absorbing device comprising a top follower secured to one of said plates and a bottom follower secured to the other thereof, one of said followers comprising spaced parallel vertical friction walls and the other of said followers comprising a vertical wall interposed between said friction walls and forming a shoe carrier, friction shoes mounted on opposite sides of said carrier in engagement with said friction walls respectively, and resilient means interposed between said carrier and said shoes.

4. A friction absorbing device comprising spaced followers, one of said followers having integrally formed spaced parallel vertical friction surfaces, the other of said followers having a shoe carrier extending between said friction surfaces, shoes mounted on opposite sides of said carrier with friction walls in engagement with said surfaces respectively, each of said shoes having a box-like form, a resilient pad housed in each of said shoes under compression between the enclosing shoe and said carrier, and means restricting relative vertical movement between said carrier and said shoes.

5. In a spring group, top and bottom spring plates, coil springs interposed therebetween and an associated control unit centrally located with respect to said coils and comprising top and bottom followers secured to said plates respectively, one of said followers having spaced parallel friction walls and the other of said followers having a shoe carrier interposed between said friction walls, friction shoes mounted on opposite sides of said carrier in engagement with said walls respectively, and resilient means interposed between said carrier and said shoes.

6. In a spring group, top and bottom spring plates, coil springs interposed therebetween, and a plurality of associated control units on opposite sides of said coil springs, said control units comprising top and bottom followers secured respectively to said plates, one of said followers having spaced parallel vertical friction walls, and the other of said followers having a shoe carrier extending between said walls, friction shoes mounted on said carrier in engagement with said walls, and resilient means under compression between said carrier and each of said shoes.

7. A friction absorbing device comprising spaced followers, one of said followers having integrally formed spaced parallel vertical friction surfaces, and the other of said followers having a shoe carrier extending between said friction surfaces, shoes mounted on opposite sides of said carrier with friction walls in engagement with said surfaces respectively, each of said shoes having a box-like form, and a resilient pad housed in each of said shoes under compression between the enclosing shoe and said carrier.

8. In a friction absorbing device, a top follower in the form of an inverted housing having friction walls, a bottom follower having a vertical shoe support extending between said walls, and friction shoes of box-like form carried on opposite sides of said support with friction surfaces in engagement with said housing, resilient means under compression between said support and said shoes, and engaging means on said shoes and said shoe support preventing relative vertical movement therebetween.

9. In a friction absorbing device, spaced followers, one of said followers having parallel friction surfaces, the other of said followers having a shoe carrier projecting between said surfaces, shoes mounted on said carrier with friction walls in engagement with said friction surfaces respectively, a rubber pad under compression between said carrier and each of said shoes, and engaging means on said carrier and said shoes preventing relative vertical movement therebetween.

10. A friction absorbing device comprising top and bottom followers, one of said followers having integrally formed spaced parallel vertical friction surfaces, the other of said followers having a shoe carrier extending between said friction surfaces, shoes mounted on opposite sides of said carrier with friction walls in engagement with said surfaces respectively, and resilient means under compression between said carrier and said shoes.

11. In a friction absorbing device, a top follower having an inverted housing with parallel friction surfaces, a bottom follower having a friction shoe support extending between said friction surfaces, friction shoes carried on said support in engagement with said friction surfaces, resilient means under compression between each of said shoes and said carrier, and enngaging means on said carrier and said shoes preventing relative vertical movement therebetween.

12. In a friction absorbing device, a top follower in the form of an inverted housing having friction walls, a bottom follower having a vertical shoe support extending between said walls, and friction shoes of box-like form carried on opposite sides of said support with friction surfaces in engagement with said housing, and resilient means under compression between said support and said shoes.

13. In a friction absorbing device, a top follower in the form of an inverted housing having parallel spaced friction surfaces, a bottom follower in the form of a shoe carrier, friction shoes mounted on said carrier for vertical movement therewith, resilient means under compression between said shoes and said carrier, each of said shoes engaging one of said parallel friction surfaces.

14. In a friction absorbing device, a follower having a base wall and a friction housing of rectangular form therewith, spaced parallel vertical plane friction surfaces on opposite walls of said housing, relieved areas on said walls between said friction surfaces and said base wall, and vertical slots formed on the other opposite spaced walls of said housing for reception of an associated friction shoe carrier.

15. In a friction absorbing device, a follower comprising a base wall and a vertical wall substantially at right angles thereto, said vertical wall having on opposite faces thereof raised pads affording spring seats, positioning means on said pads for the associated springs, and lugs formed adjacent the lower edges of said pads for engagement with associated friction shoes.

16. In a friction absorbing device, a follower having a base wall and a friction housing of rectangular form therewith, spaced plane friction surfaces on opposite walls of said housing, relieved areas on said walls between said friction surfaces and said base wall, said housing having aligned slots at opposite ends thereof for cooperation with an associated member.

17. In a friction absorbing device, a follower comprising a base wall and a vertical wall substantially at right angles thereto, said vertical wall having on opposite faces thereof raised pads affording spring seats, and positioning means on said pads for the associated springs.

18. In a friction absorbing device, a top follower in the form of an inverted housing having friction walls, a bottom follower having a vertical shoe support extending between said walls, and friction shoes of box-like form carried on opposite sides of said support with friction surfaces in engagement with said housing, resilient means urging said shoes into engagement with said surfaces, and engaging means on said shoes and said shoe support restricting relative vertical movement therebetween.

19. A friction absorbing device comprising relatively movable members, one of said members having integrally formed parallel friction surfaces, the other of said members having a shoe carrier extending between said surfaces, and friction shoes resiliently mounted on said carrier for engagement with said surfaces, each of said shoes housing the resilient means associated therewith.

20. A friction device comprising relatively movable members, one of said members having thereon opposed plane friction surfaces, the other of said members having shoe carrying means in spaced relation with respect to said surfaces, and friction shoes resiliently mounted on said carrying means in engagement with said surfaces, each of said shoes affording a housing for an associated resilient member.

21. In a friction absorbing device, relatively movable members, one of said members comprising a housing with parallel friction surfaces, the other of said members having a friction shoe support interposed between said surfaces within said housing, and a friction shoe resiliently mounted on said support in engagement with each of said surfaces.

22. In a spring group, top and bottom plates, a coil spring interposed therebetween, and a friction absorbing device associated therewith and comprising relatively movable members fixed respectively to said plates, one of said members having opposed plane friction surfaces and the other of said members resiliently supporting spaced friction shoes in engagement with said surfaces respectively.

23. In a spring group, top and bottom spring plates, a coil spring confined therebetween, spaced oppositely disposed friction housings mounted on one of said plates, oppositely disposed friction walls on each of said housings, a friction shoe in engagement with each of said walls, and means on the other of said plates for actuation of said shoes.

ROBERT B. COTTRELL.